United States Patent
Bonn et al.

(10) Patent No.: US 8,045,694 B2
(45) Date of Patent: Oct. 25, 2011

(54) INTERFACE FOR PROVIDING CONNECTION OF A SWITCH AND A VMS USING AN IP NETWORK

(75) Inventors: Michael Brian Bonn, Somonauk, IL (US); Ravi Ravichandran, Naperville, IL (US)

(73) Assignee: Comnet International, Co., Lisle, IL (US)

( * ) Notice: Subject to any disclaimer, the term of this patent is extended or adjusted under 35 U.S.C. 154(b) by 1577 days.

(21) Appl. No.: 11/285,641

(22) Filed: Nov. 22, 2005

(65) Prior Publication Data

US 2006/0083363 A1 Apr. 20, 2006

Related U.S. Application Data

(63) Continuation-in-part of application No. 10/036,658, filed on Dec. 21, 2001, now Pat. No. 7,006,611.

(51) Int. Cl.
*H04M 7/00* (2006.01)

(52) U.S. Cl. .............. 379/221.01; 370/216; 370/225; 370/264

(58) Field of Classification Search .......... 714/13; 370/352, 467, 216, 264, 225; 379/88.17, 379/88.14, 88.25, 221.01
See application file for complete search history.

(56) References Cited

U.S. PATENT DOCUMENTS

| | | | |
|---|---|---|---|
| 5,022,070 A | 6/1991 | Forson et al. | |
| 5,255,314 A | 10/1993 | Applegate et al. | |
| 5,978,450 A | 11/1999 | McAllister et al. | |
| 5,991,263 A * | 11/1999 | Bales et al. | 370/225 |
| 6,134,671 A | 10/2000 | Commerford et al. | |
| 6,278,688 B1 | 8/2001 | Suutari et al. | |
| 6,625,273 B1 | 9/2003 | Ashdown et al. | |
| 6,678,369 B2 | 1/2004 | DeMent et al. | |
| 6,798,749 B1 | 9/2004 | Lehto | |
| 7,032,129 B1 * | 4/2006 | Borresen et al. | 714/13 |
| 7,376,139 B1 * | 5/2008 | McDonald et al. | 370/410 |
| 7,814,218 B1 * | 10/2010 | Knee et al. | 709/230 |
| 2001/0036255 A1 * | 11/2001 | Reformato et al. | 379/88.01 |
| 2002/0051425 A1 | 5/2002 | Larsson | |
| 2002/0156896 A1 | 10/2002 | Lin et al. | |
| 2003/0012183 A1 * | 1/2003 | Butler et al. | 370/352 |
| 2006/0174159 A1 * | 8/2006 | Borresen et al. | 714/13 |

* cited by examiner

*Primary Examiner* — Fan Tsang
*Assistant Examiner* — Simon King
(74) *Attorney, Agent, or Firm* — Clark Hill PLC

(57) ABSTRACT

An interface for use in a telephone communication system provides for connection of a telephone switch to an IP network, allowing data signals between the telephone switch and a VMS to be transmitted by the IP network. In addition to transmission of the signals over an IP network, the interface can be configured to provide additional functionality including translation of the message protocol; connection of the interface to a network operations center; verification of message accuracy and completeness; acknowledgment of the receipt of a message; activation/deactivation of a message waiting indicator; connection to an SS7 network; back-up transmission between the IP network and the switch; and proxy/redirect of voice signals.

17 Claims, 15 Drawing Sheets

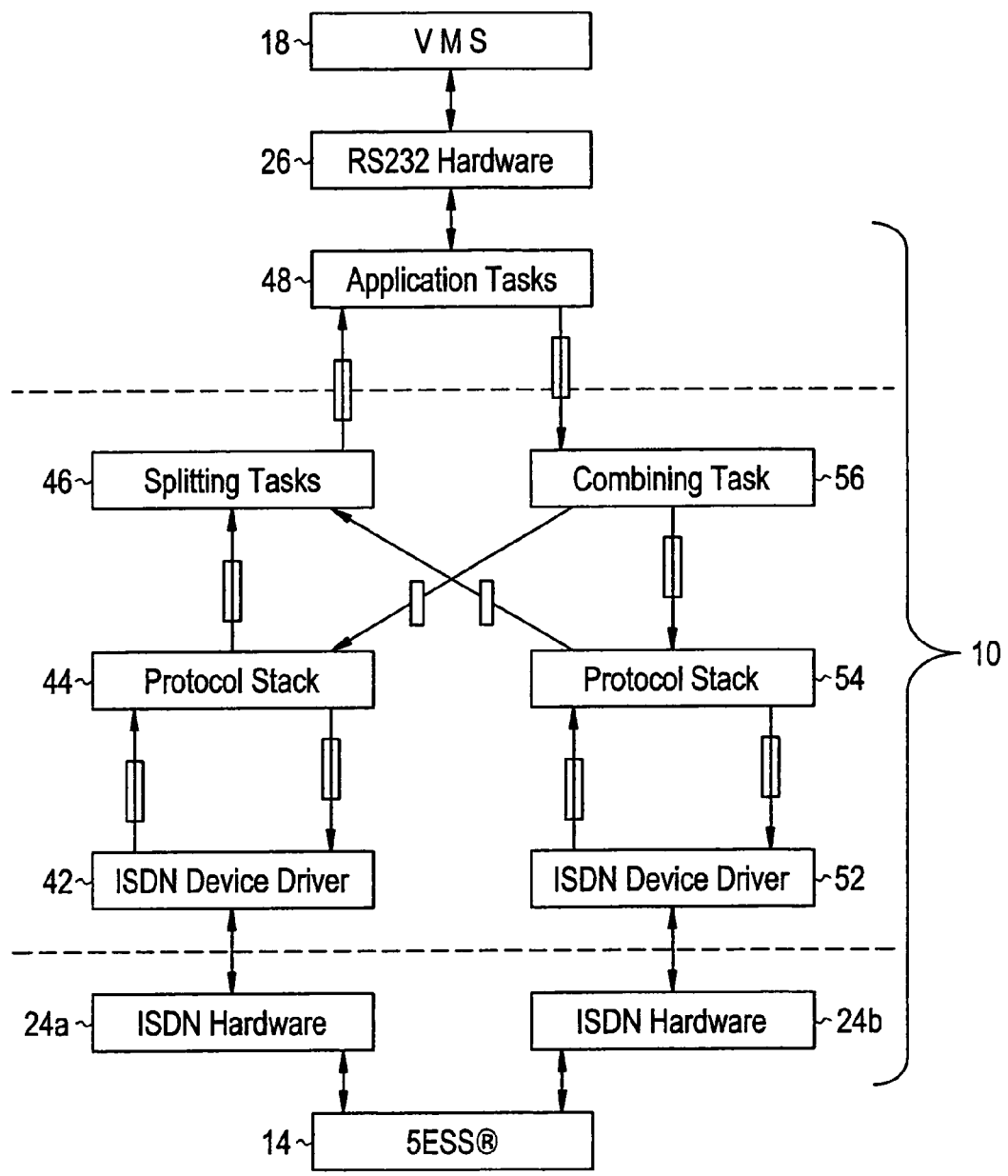

FIG. 4A

ISDN DRIVER (Interrupt Service Routine)

If the Cause of Interrupt IS A New frame received

Receive the frame from 5ESS switch through the hardware in a temporary buffer
    Test for its integrity
    If it is a good frame Forward it to the Protocol Stack, else discard it End If If the Cause of Interrupt IS Link Deactivated Reset the protocol stack Link_Deactivated=TRUE End If If the Cause of Interrupt IS Link Activated AND Link_Deactivated=TRUE Link_Activated=FALSE
    Power up the protocol stack End If

FIG. 4B

PROTOCOL STACK

The protocol stack consists of three sub-layers each implementing the data link, network and transportation layer of the protocol. Each layer does the following processing FOREVER
    1. Wait for a 5E Frame.
    2. Determine if the frame is a control packet or a data packet.
    3. If it is a control packet
        a. Send an appropriate response (varies for error Control, flow control, link integrity checking etc.,) to the lower layer.
        b. Based on the type of the control packet, take the stack to a different state.
    4. If the received packet is a data packet without errors AND the stack is in Data Transfer State, forward it to the upper layer of the stack. (Upper layer for the three sub-layers will be network layer, transportation layer and splitting task).
END FOREVER

FIG. 4C

SPLITTING TASK:

FOREVER
    1. Read the message from the protocol stack.
    2. Split the message into individual call messages.
    3. Forward it to the application task.
END FOREVER

FIG. 4D

APPLICATION TASK:

FOREVER
    1. Read the message delivered by the Splitting Task.
    2. Translate the message from the 5ESS format to 1AESS format.
    3. Deliver it to the VMS through the RS232 Hardware.
END FOREVER

FIG. 4E

APPLICATION TASK:

FOREVER
        1. Receive the message from the VMS through the RS232 hardware.
        2. Translate the message from the 1AESS format to the 5ESS format.
        3. Forward it to the COMBINING TASK.
END FOREVER

FIG. 4F

COMBINING TASK:

LinkToBeSent=1

FOREVER

Receive The Message from the Application and Combine Them

If both the links are in a working condition

Send the Combined Message to the stack corresponding to Link indicated by LinkToBeSent If LinkToBeSent=0 then LinkToBeSent=1 else LinkToBeSent=0

End if

If one of the links is failed, send it to the stack corresponding to the healthy link.

End FOREVER

FIG. 4G

PROTOCOL STACK

Stands Blocked until the protocol stack is in the DATA TRANSFER STATE.

FOREVER

Wait for a Message from the COMBINING TASK

Receive in a temporary buffer and Append Control Information to the translated message.

Forward it to the ISDN Device Driver

END FOREVER

FIG. 4H

ISDN DRIVER (Interrupt Service routine)

IF the cause of the Interrupt is "Ready for Transmission"

If the input message queue has any message
        Transmit it to the 5ESS Switch through the hardware
    End If
End If

INTERFACE FOR PROVIDING CONNECTION OF A SWITCH AND A VMS USING AN IP NETWORK

This application is a continuation-in-part of application Ser. No. 10/036,658 filed Dec. 21, 2001, now U.S. Pat. No. 7,006,611 issued Feb. 28, 2006.

BACKGROUND OF THE INVENTION

This invention is generally directed to an improved interface for use in connection with a telecommunication system. A telecommunication system often includes a telephone switching system and an adjunct processor such as a voice messaging system (VMS).

The telephone switching system processes messages from multiple telephones and their users. These messages are often further processed and stored in the VMS.

Messages in the telecommunication system are comprised of a voice and a data message component. The voice component relates to the voice message which has been recorded and the data component identifies information, such as, where the call originated, the destination of the call, and the time of the call. The data component of the message can also include, for example, signaling to turn off or on a light on the telephone to indicate whether messages directed to the user are waiting for delivery in the VMS.

A problem which is often encountered in a telecommunication system is that the telephone switching system utilizes a different protocol than the adjunct processor. A protocol is a set of rules governing the format of data which is exchanged between microprocessors. Two types of protocols, for example, are Application Processor Interface (API) and Simplified Message Service Interface (SMSI). In order for data messages to be forwarded from the telephone switch to the adjunct processor, the microprocessor within the adjunct processor must recognize the protocol of the data messages from the telephone switch. Likewise, in order for data messages to be forwarded from the adjunct processor to the telephone switch, the microprocessor within the telephone switch must recognize the protocol of the data messages from the adjunct processor. Often however, telecommunication switches and adjunct processors do not utilize the same protocol. For example, many switches operate using API protocol and many VMS operate using SMSI protocol. In order for the VMS and the telecommunication switch to operate together an interface (or protocol converter) is needed to convert the API protocol messages delivered from the switch to SMSI protocol. Once the data is formatted in SMSI protocol, the data can be utilized by the VMS. Similarly, the data delivered from the VMS is converted from SMSI protocol to API protocol so that it may be utilized by the switch.

In the past, interfaces have been used to accomplish the translation of data messages between telephone switches and VMS. A number of problems, however, have been encountered when these interfaces are implemented. First, the number of messages which can be transmitted between the switch and the VMS is limited by the capacity of the interface. Another problem is the failure of the transmission link provided by the interface. Because all messages to be processed by the VMS must be transmitted through the interface's single link, if the link fails, no messages can be delivered to the VMS. Moreover, when links fail it is often difficult to determine the cause of the failure.

Previously the problems of link failure have been solved by connecting an additional interface between the telephone switch and the VMS. The use of a second interface, however, doubles the cost of the system and the space required for housing the system. Additionally, although additional capacity is provided by the second interface, this additional capacity is often unnecessary. In many situations, the capacity provided by a single interface is sufficient to meet the demands of the system. The problem rather lies in failure of the link provided by the interface and the inability of the interface to process and translate data messages upon failure of the link.

A telephone system 100 which provides connection between a number of switches 102 and a VMS 104 is shown in FIG. 5. Two connections are provided between each switch 102 and the VMS 104 to carry the communication signals between the switches 102 and the VMS 104. A first connection carries the voice portion 106 of the communication signal and the second connection carries a data portion 108 of the signal. The voice portion 106 of the signal is carried directly over the first connection from the switch 102 to the VMS 104 and vice versa. The data portion 108 of the signal typically includes a message waiting indicator (MWI) portion, for example, which provides an instruction from the VMS 104 to turn on/off a light on a telephone 110 in communication with the switch 102 and provides an indication as to whether the user has messages waiting at the VMS 104. As discussed above, because the protocol of the switch 102 is often different than the protocol used by the VMS 104, a translator or interface 112, translates the data from the protocol used by the VMS 104 to the protocol used by the switch 102 and vice versa to provide communication between the VMS 104 and the switch 102.

Modems 114 are used to transmit the data signals 108 between the interface 112 and the VMS 104. Once the connection is obtained with a modem 114, the data is streamed from point-to-point along the circuit. Thus, several connections are provided in order to carry the data signals 108 between the switch 102 and the VMS 104. These connections are subject to breakage and failure and the reasons for failure may be difficult to determine. Often it is necessary for an individual to inspect the various connections to determine the cause of failure. Any number of occurrences can cause failure of the numerous connections. For example, a cable may be broken during a digging operation or a modem may fail. Any of these failures prevent the data from being transmitted along the points and therefore between the switch 102 and the VMS 104.

The present invention provides an improved interface which overcomes the problems presented in the prior art and which provides additional advantages over the prior art, such advantages will become clear upon a reading of the attached specification in combination with a study of the drawings.

OBJECTS AND SUMMARY OF THE INVENTION

An object of the present invention is to provide an interface with improved performance;

Another object of the present invention is to provide an interface with improved reliability;

A further object of the present invention is to provide an interface which improves the performance and reliability of the system while minimizing the number of electrical connections between the interface and the adjunct processor;

A further object of the present invention is to provide a cost efficient interface;

Yet a further object of an embodiment of the present invention is to provide an interface which allows for monitoring of communication signals in the telephone system;

Still a further object of an embodiment of the present invention is to provide an interface which allows for transmission of the data portion of communication signals in a telephone system without the use of modems;

Still a further object of an embodiment of the present invention is to provide an interface which reduces the number of connections needed to transmit the data portions of communication signals in a telephone system;

Still another object of an embodiment of the present invention is to provide an interface which can evaluate the accuracy of data messages transmitted between a VMS and a switch;

Still another object of an embodiment of the present invention is to provide a versatile interface which can process data messages utilizing different protocols; and Yet another object of an embodiment of the present invention is to provide an interface which provides for transmission of data messages from the VMS to an SS7 network.

Briefly, and in accordance with the foregoing, the present invention discloses an improved interface between a telephone switching system and an adjunct processor. The interface provided by the present invention allows for improved performance and reliability. The improved performance and reliability are achieved by utilizing multiple transmission links for processing data messages between the telephone switching system and the adjunct processor and by implementing unique operating software to selectively and automatically control the data transmission and retransmission of the data along the links. If one transmission link fails, all messages are processed by the remaining link or links. The improved interface also provides for transmission of data messages between the switches and the VMS through a network and provides additional functionality in connection with the data messages.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 3 is a block diagram representing the processing of messages by the interface between a telephone switch and a VMS;

FIG. 4a is an outline of the steps performed by the device driver algorithm of the interface of the present invention when processing messages in the forward direction;

FIG. 4b is an outline of the steps performed by the protocol stack algorithm of the interface of the present invention when processing messages in the forward direction;

FIG. 4c is an outline of the steps performed by the splitting task algorithm of the interface of the present invention;

FIG. 4d is an outline of the steps performed by the application task algorithm of the interface of the present invention when processing messages in the forward direction;

FIG. 4e is an outline of the steps performed by the application task algorithm of the interface of the present invention when processing messages in the reverse direction;

FIG. 4f is an outline of the steps performed by the combining task algorithm of the interface of the present invention;

FIG. 4g is an outline of the steps performed by the protocol stack algorithm of the interface of the present invention when processing data messages in the reverse direction;

FIG. 4h is an outline of the steps performed by the device driver algorithm of the interface of the present invention when processing data messages in the reverse direction;

DETAILED DESCRIPTION OF THE PREFERRED EMBODIMENT

Figure 1:
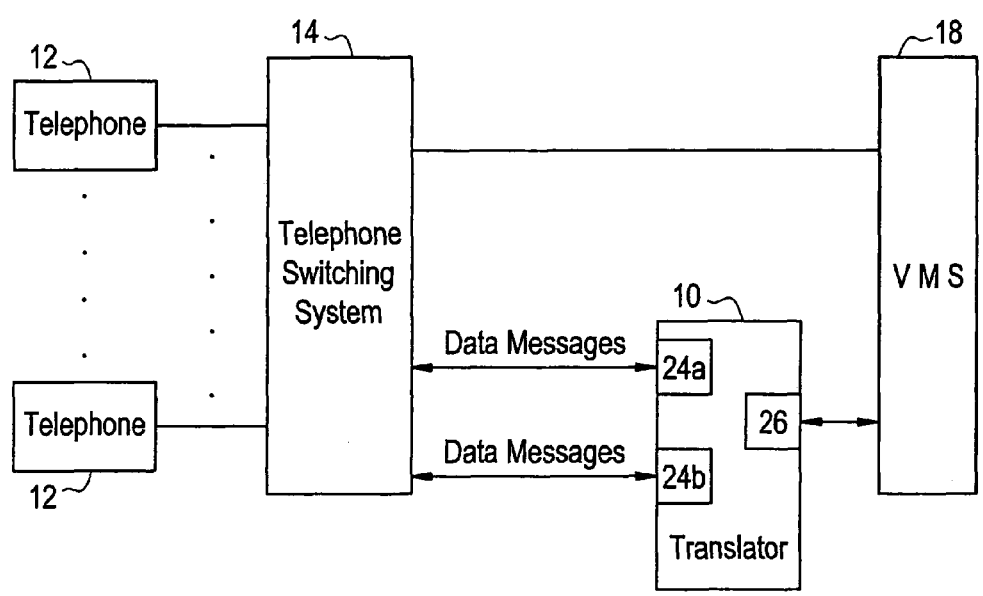
FIG. 1 is a block diagram representing a portion of a telecommunications system in which the interface of the present invention is used.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

As shown in FIG. 1, the interface 10 of the present invention is to be used in a telecommunication system. The telephone switching system 14 provides communication services for a number of telephones 12 and their users. One type of switch 14 typically used in a telecommunication system is the 5ESS switch made by Lucent Technologies, for example. The interface 10 provides a connection for the transmission of data messages from the telephone switching system 14 to the adjunct processor 18 and from the adjunct processor 18 to the telephone switching system 14. The adjunct processor 18 shown in FIG. 1 is a Voice Messaging System (VMS). Although the interface 10 of the present invention could be adapted for use with other types of adjunct processors, the interface 10 of the present invention will be shown and described in connection with a VMS.

The present invention will be described in the context of a VMS which utilizes SMDI protocol and a telephone switch which utilizes API protocol, although it is to be understood that the present invention can be used with a telephone switch and adjunct processor which utilize any protocol. Because the telephone switch 14 and the VMS 18 do not utilize the same protocol, the interface 10 of the present invention provides the necessary translation.

Within the context of this description of the invention, when the interface 10 receives messages from the switch 14 and delivers the messages to the VMS 18 it is said to be operating in the forward direction. When the interface 10 receives messages from the VMS 18 and delivers the messages to the switch 14 it is said to be operating in the reverse direction. When operating in the forward direction, the interface 10 receives API protocol messages from the switch 14 and delivers the message to the VMS 18 in SMDI protocol. When operating in the reverse direction, the interface 10 receives SMDI protocol messages from the VMS 18 and delivers the message to the switch 14 in API protocol.

Figure 2A:
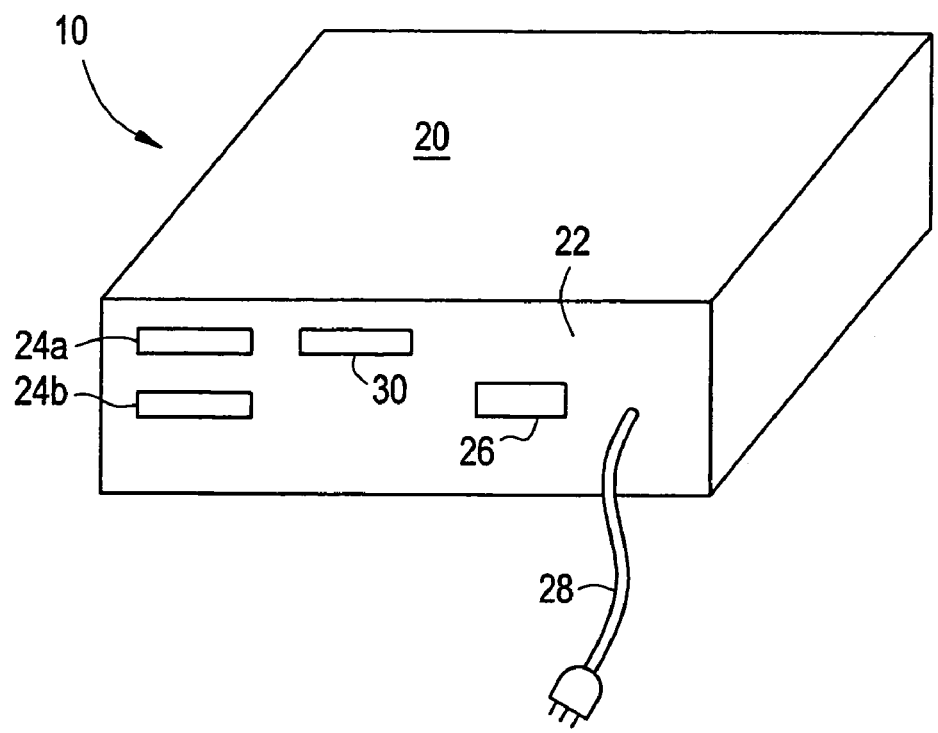
FIG. 2a is a front perspective view of an embodiment of the interface of the present invention.
Figure 2B:
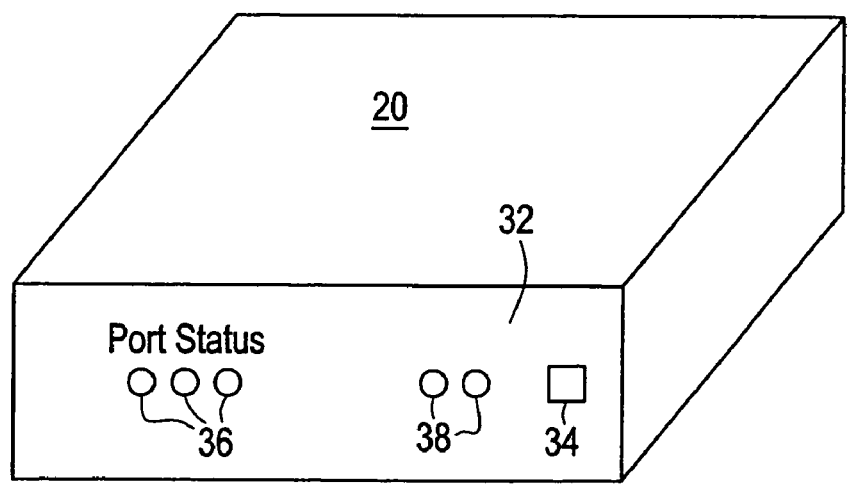
FIG. 2b is a rear perspective view of the interface of the present invention.

As shown in FIGS. 2a and 2b, the interface 10 has a generally rectangularly shaped housing 20 which houses the hardware and software components of the interface 10. Electrical connection of the interface 10 is provided through the rear panel 22 of the housing 20. Connectors 24a, 24b provide electrical connection between the interface 10 and the switch 14. Connector 26 provides electrical connection between the interface 10 and the VMS 18. Power is supplied to the interface 10 through a power cord 28. In the preferred embodiment, an additional connector 30 is provided for allowing electrical connection of a diagnostic device.

The front panel 32 of the interface housing 20 includes several light emitting diodes (LEDs). A power LED 34 indicates whether power has been provided to the interface 10. Port status LEDs 36 provide indication of which connectors 24a, 24b 30 are in use. Link status LEDs 38 provide indication that data is being transmitted over the particular link indicated.

FIG. 3 is a diagram which represents the hardware connections between the switch 14, the interface 10 and the VMS 18. Unlike prior art interfaces, multiple electrical connections between the interface 10 and the switch 14 are provided by, for example, the connectors 24a, 24b which allow for the processing of data messages over multiple links. The connector 26 provides connection between the interface 10 and the VMS 18.

Although it is fully contemplated that the interface can provide more than two transmission links, for purposes of clarity in explanation, the invention will be described below as including only two transmission links. The processing of the data messages by the software component of the interface 10 is also shown in FIG. 3. The diagram shows the forward flow of data messages from the switch 14 to the VMS 18 and the reverse flow of data messages from the VMS 18 to the switch 14. The software component of the interface 10 is a series of algorithms which resides in the microprocessor of the interface 10. This microprocessor is typically mounted to a circuit board which is mounted within the housing 20 of the interface 10. The microprocessor includes flash, dynamic and RAM memory. When power is delivered to the interface 10 the algorithmic software program is copied from the flash memory, to the dynamic memory and finally to the RAM where the program is executed. The interface's program is responsible for processing and translating messages between the switch 14 and the VMS 18. The software of the interface 10 is programmed such that the interface receives and processes data through two links provided by connector 24a, 24b. The software of the interface 10 is a series of algorithms/ routines which process data messages between the switch 14 and the VMS 18. Each algorithm is a series of instructions which perform specific functions associated with processing the data messages.

More specifically, in the forward direction, messages packets are transmitted to the interface 10 from the switch 14 via the connectors 24a, 24b. A message packet contains data related to one or more individual messages. The message packets are processed through the two links and transmitted to the VMS 18 through the connector 26. The connectors 24a, 24b of the interface 10 are connected to the switch 14 in a customary manner, such as that provided by Lucent Technologies specification 235-900-303 which details the protocol that is being utilized, and is incorporated herein by reference.

Processing of the data messages includes several steps. The forward processing of messages from the switch 14 to the VMS 18 will first be described. On the first link provided by the interface, the message packets are transmitted from the switch 14 to a first device driver algorithm 42 through the connector 24a. The driver for the port is to be implemented in the form of an interrupt service routine and can process both B and D channel data. An intelligent ISDN controller chip such as the PEB 2086, manufactured by Siemens Semiconductors can be used for implementation of the ISDN port.

The steps performed by the device driver algorithm 42 operating in the forward direction are shown in FIG. 4a. The device driver algorithm 42 receives the data message packets, filters erroneous frames from the message packets, and forwards the message packets to the protocol stack algorithm 44.

The protocol stack algorithm 44 validates the message packets. The steps performed by the protocol stack algorithm 44 when processing data messages in the forward direction are shown in FIG. 4b. The protocol stack algorithm 44 performs three layers of validation. The first layer of validation is comprised of basic error checking. A second layer of validation confirms that the proper protocol as directed by the connector 28a has been met. The third layer of validation confirms that the proper protocol as directed by the switch 14 has been met. In the case of the 5ESS switch, the third layer of validation is to confirm that the data meets the proper API protocol. After completion of the validation by the protocol stack algorithm 44, the message packets are forwarded to the splitting task algorithm 46.

The splitting task algorithm 46 splits the message packets into individual messages. The steps performed by the splitting task algorithm 46 are shown in FIG. 4c. After splitting the message packets into individual messages, the messages are forwarded to the application task algorithm 38.

The application task algorithm 48 translates the individual messages from API protocol to SMSI protocol. The steps of the application task algorithm 48 when processing messages in the forward direction are shown in FIG. 4d. After translation, the application task algorithm 48 transmits the translated messages to the VMS 18 by way of the connector 26.

On the second link provided by the interface 10, the data messages are processed in the forward direction in the following manner. The message packets are transmitted from the switch 14 to a first device driver algorithm 52 through the connector 24b. The steps of the device driver algorithm 52 are shown in FIG. 4a. The device driver algorithm 52 receives the message packets, filters erroneous frames from the message packets, and forwards the message packets to the protocol stack algorithm 54. The protocol stack algorithm 54 validates the message packets. The steps performed by the protocol stack algorithm 54 is shown in FIG. 4b. The protocol stack algorithm 54 performs three layers of validation in the same manner as the protocol stack algorithm 44. After completion of the validation by the protocol stack algorithm 54, the message packets are forwarded to the splitting task algorithm 46.

The splitting task algorithm 46 splits the message packets into individual messages. The steps of the splitting task algorithm are shown in FIG. 4c. After splitting the message packets into individual messages, the messages are transmitted to the application task algorithm 48.

Figure 6:
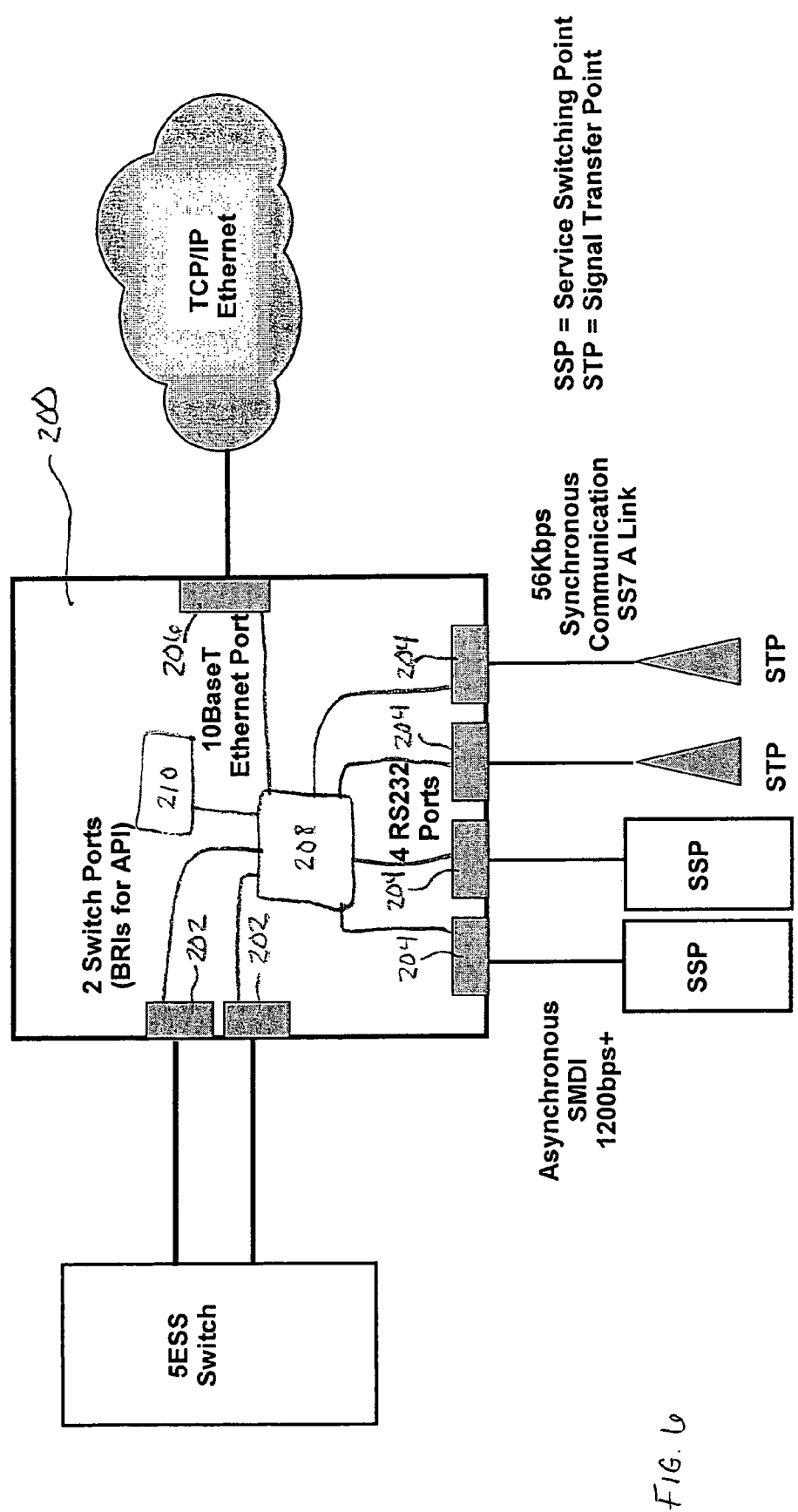
FIG. 6 is a block diagram representing an embodiment of the interface of the present invention.

The application task algorithm 48 translates the individual messages from API protocol to SMSI protocol. The steps of the application task algorithm are shown in FIG. 6. After translation, the application task algorithm 38 transmits the translated messages to the VMS 18 by way of the connector 30.

In the reverse direction the interface 10 transmits individual data messages from the VMS 18 to the interface 10. The data messages are processed in the following manner.

Individual messages are transmitted from the VMS 18 to the application task algorithm 38 through the connector 30. The application task algorithm translates the individual SMSI protocol messages into individual API protocol messages and forwards the messages to the combining task algorithm 56. The steps performed by the application task algorithm when processing messages in the reverse direction are shown in FIG. 4e.

The combining task algorithm 56 combines individual API protocol messages into API protocol message packets and forwards the message packets to the protocol stack algorithms 34, 44. The combining task algorithm 46 alternates delivery of message packets between the two protocol stack algorithms 44, 54. The steps performed by the combining task algorithm 56 are shown in FIG. 4f.

The protocol stack algorithm 44 receives the message packets from the combining task algorithm 56 and validates the message packet. The protocol stack algorithm 54 receives the message packets from the combining task algorithm 56 and validates the message packets. The steps performed by the protocol stack algorithms 44, 54 in the reverse direction is shown in FIG. 4g.

Additional visual representations of the context and queue of each of the key tasks performed by the interface of the present invention are shown in Appendix A.

After validation, the protocol stack algorithm 44 transmits the message packets to the device driver algorithm 42 and the protocol stack algorithm 54 transmits the message packets to the device driver algorithm 52. The device driver algorithm 42 transmits the message packets to the switch 14 through the connector 24a and the device driver algorithm 52 transmits the message packets to the switch 14 through the connector 24b. The steps performed by the device driver algorithms 42, 52 when processing messages in the reverse direction are shown in FIG. 4h.

Thus, in the two-link interface described a first link is formed by the connector 28a, the device driver algorithm 42, protocol stack algorithm 44, the splitting task algorithm 46, the application task algorithm 48, and the connector 26. A second link is formed by the connector 24b, the device driver algorithm 52, the protocol stack algorithm 54, the splitting task 46, the application task 48 and the connector 48. With the addition of the second link, the interface 10 provides improved performance in that the transmission of the data is divided between each of the two links. The addition of a second link also improves the interface reliability. In the event that the first link fails, all data messages are processed by the interface through the second link. Likewise, if the second link fails, all messages are processed by the interface through the first link. Unlike the prior art, the interface of the present invention can continue to operate in the event of link failure. By providing multiple links within the interface 10, for processing data between the switch 14 and the VMS 18, the reliability of the interface is improved without unnecessarily increasing the cost and capacity of the interface.

The improved performance of the interface of the present invention is achieved without increasing the rack space occupied by the interface. The additional connector needed to provide a two link interface can be added to rear panel 22 of the panel housing 20 without increasing the size of the panel. The additional software needed to provide a two link interface can be accommodated on the existing circuit board within the housing 20.

If two prior art interfaces were used in an attempt to improve reliability and performance, three additional electrical connections would be needed. An additional connection would be needed between the switch 14 and the second interface, between the second interface and the VMS, and to power the second interface. The use of a two link interface however, requires only one additional electrical connection between the switch 14 and the interface 10.

As noted above, although the interface of the present invention has been shown and described as having two links, the interface 10 could be constructed with more than two links. For example, three connectors could be provided between the switch 14 and the interface 10, thus providing three links. In a three link interface, three device drivers and three protocol stacks would also be provided. The splitting task algorithm would receive data messages from three protocol stacks and would deliver these messages to the application task algorithm 48 for translation. When operating in the reverse direction, the combining task of a three link interface would deliver the message packets to three protocol stacks in an alternating fashion. In the event of a link failure in a three link interface, the remaining two links would continue to process the data messages. Additionally, if two of the three links failed, the remaining link would be available to process and translate the data messages.

An interface 200 for use in a telecommunication system is shown in FIG. 6. The interface 200 includes two BRI type ports 202 from making connection between the interface 200 and a 5ESS type switch, four RS232 type ports 204 for making connection between the interface 200 and SSP type switch and STPs, and an ethernet port 206 for providing connection between the interface and a TCP/IP network. The interface 200 includes a microprocessor 208 in connection with the ports, 202, 204, 206 and a memory 210 operatively connected to the microprocessor 208. The memory 210 includes programming to be carried out by the microprocessor 208 to provided the desire functionality to the interface 200.

The programming or software provided by the interface 200 can be designed to include a variety of functions depending on the needs of the particular system in which the interface 200 is implemented. Different manners of implementing the interface 200 will be described herein. Different functions of the interface will be described in connection with the different systems shown.

It is to be understood that it is not necessary for each of the ports 202, 204 to be active at one time. Rather, for example, in a telephone system utilizing a 5ESS type switch a port 202 is activated. In a system utilizing a SSP type switch a port 204 is activated. In the event more than one switch will transfer data to the interface and receive data from the interface, multiple ports can be activated. It is also to be understood that although the embodiment shown in FIG. 6 includes two BRI ports 202 and four RS232 ports 204, the interface 200 can be designed to include any number and variety of ports required by the system in which the interface is to be used.

It is also to be understood that the interface 200 can be programmed to include the multiple link functionality previously described in connection with the interface 10 to provided improved functionality in the event of link failure. For example, as shown in FIG. 6, the 5ESS switch is connected to two BRI ports 202 to provide for two simultaneously active links across which data is provided allowing the interface 200 to operate in the manner described above in connection with the interface 10. Thus, the two links, provide for division of the data between the 5ESS switch and the TCP/IP network across two links. Improved reliability is also provided because if one of the links should fail, the messages can be transmitted over the remaining link. The multiple link functionality is not, however, required. As shown in FIG. 6 for example, each SSP type switch is connected to a single port 204 and therefore is not configured to provide multiple link functionality.

Figure 7:
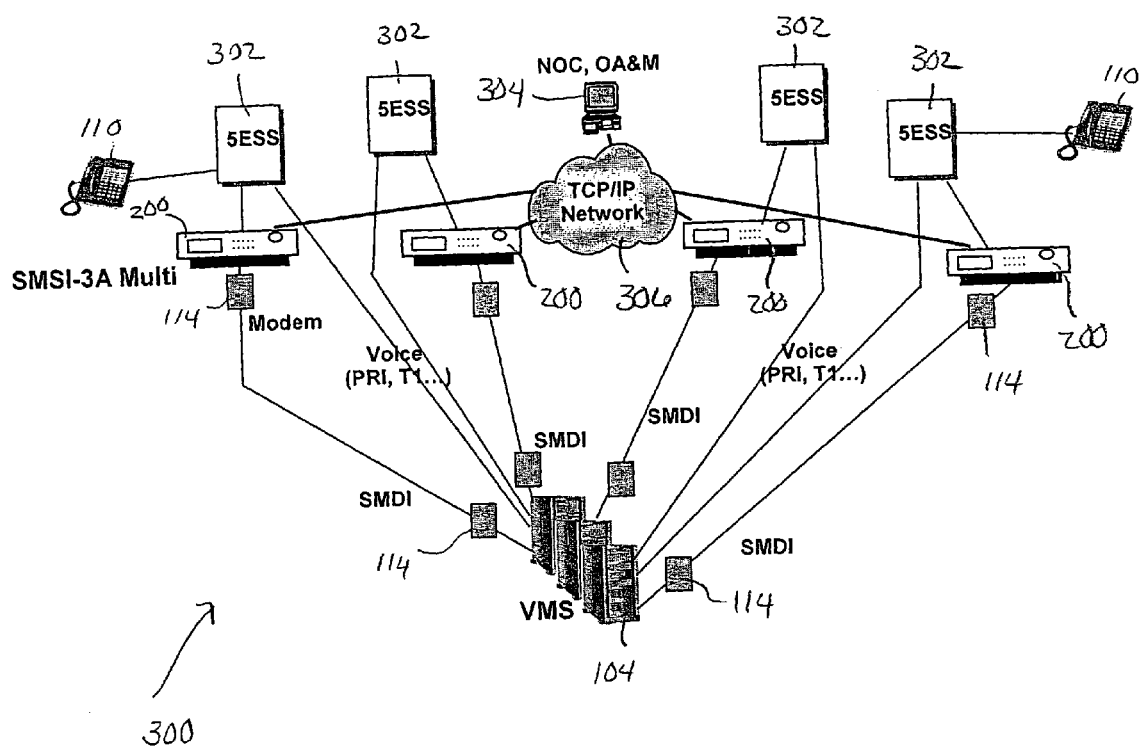
FIG. 7 is a diagram representing a telephone system incorporating an embodiment of the interface of the present invention.

FIGS. 7-11 represent different systems which utilize the interface 200. FIG. 7 show the interface 200 in connection with a system 300. The system 300 includes a plurality of switches 302 connected to telephones 110, a voice mail system 104, a plurality of interfaces 200, a network operations center (NOC) 304, a plurality of modems 114 and a network 306. The transmission of communication signals between the switches 302 and the VMS 104 is similar to the transmission of messages in the system 100 shown in FIG. 5. As previously described, each communication signal includes a voice portion and a data portion.

The switches 302 of the system 300 are 5ESS type switches. Each switch 302 is associated with an interface 200 through the ports 202 of the interface 200. Transmission of the data portions of the communication signals between the switches 302 and the VMS 104 occurs through the interfaces 200.

The VMS 104 of the system 300 processes messages using the SMDI protocol. The interfaces 200 therefore provide translation of the data portion of the messages from the 5ESS switches 302 from API protocol to SMDI protocol and translation of the data portion of the messages from the VMS 104 from SMDI protocol to API protocol.

The NOC 304 includes a computer which is designed to monitor the status of each interface 200 and the data processed by the interface 200. A connection is provided between each interface 200 and the NOC 304 through the TCP/IP network 306. Each interface 200 is connected to the TCP/IP network 306 through the port 206 of the interface 206. In addition, the NOC 304 is connected to the TCP/IP network 306. In this manner, the communications signals provided between the switches 302 and the VMS 104 can be monitored remotely.

The system 300 provides for use of an industry standard SMDI VMS 104 in connection with 5ESS type switches. This remote monitoring provides the ability to troubleshoot problems without requiring an individual to be onsite at the location of the hardware (i.e. the switch 302, the interface 200, or the VMS 104). In addition to eliminating the need for an individual to be present at the site of the switch 302 or VMS 104, remote monitoring also reduces downtime. For example, a technician can log onto the NOC to check the status of each of the interfaces 200, reset the interface 200, monitor the diagnostic log of the interface 200, and set the system parameters. These maintenance improvements result in cost reductions.

The interface 200 as provided in the system 300 supports TCP/IP allowing high-speed, resilient connections for remote links. The remote links to the interfaces 200 provide the ability to remote administer the interfaces 200. This administration can include, for example, software upgrades to the system 300. Such upgrades can be carried out using FTP, for example, and therefore are faster and easier than cumbersome E-PROM-based upgrades. Thus, administration costs for the system 300 are also reduced.

Although the system 300 is shown with four 5ESS type switches 302, it is to be understood that other types of switches, for example, SSP type switches could also be used and that any number of switches can be included in the system. In addition, a combination of different types of switches can be used.

Figure 8:
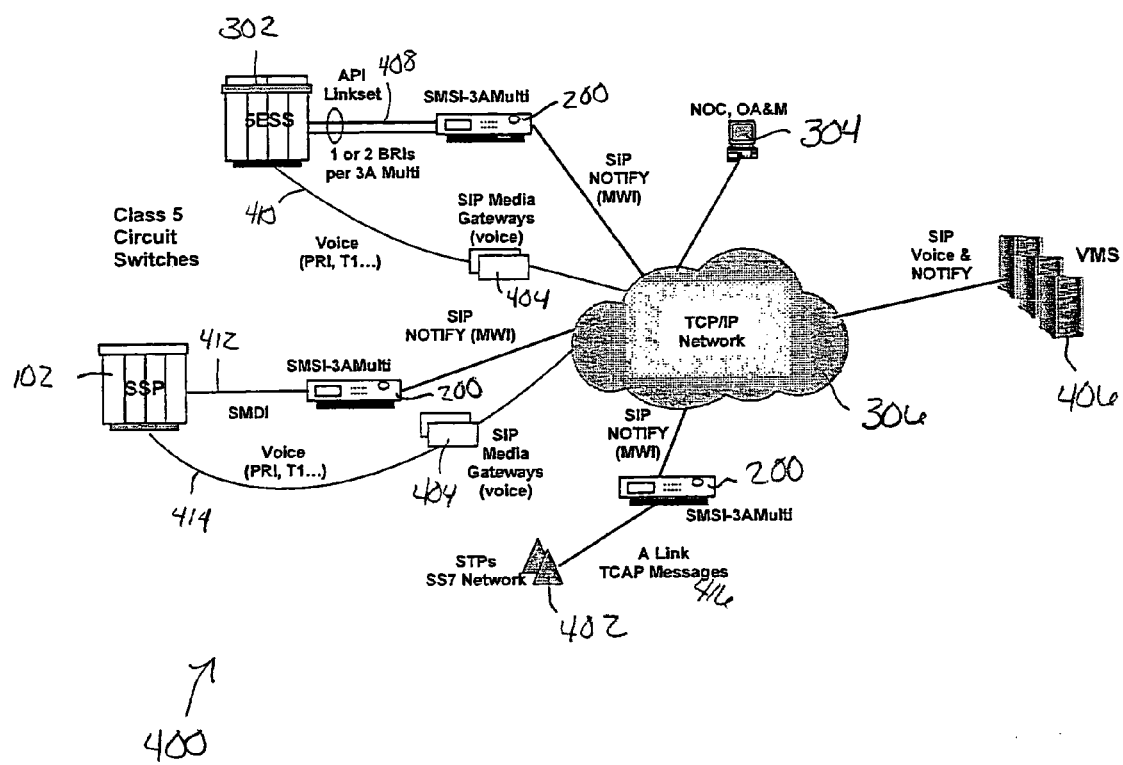
FIG. 8 is a diagram representing a telephone system incorporating the interface of the present invention in which the VMS utilizes SIP protocol.

As shown in FIG. 8, the interface 200 can be incorporated into a telephone system 400 which utilizes the IP network 306 to span the distance between the switches 302, 102 and the VMS. The system 400 includes a 5ESS switch 302, an SSP switch 102, a pair of STPs 402, a plurality of interfaces 200, media gateways 404, a network 306, a VMS 406 and a NOC 304. Unlike the previous communication system shown in FIG. 5 which provided a separate link between each switch and the VMS, the system transmits signals between the switches and the VMS through an IP network.

The VMS 406 utilizes SIP protocol and is connected to the TCP/IP network 306. As previously described, each communication signal transmitted between the switch 302 and the VMS 406 includes a data portion 408 and a voice portion 410. The 5ESS switch 302 processes the data portion 408 of the signal in API protocol. Because the VMS 406 uses SIP protocol, the data portion of the communication signals between the 5ESS switch 302 and the VMS 406 must be translated from API to SIP protocol and vice versa. This translation is performed by the interface 200. Examples of API messages provided from the switch include CALL_INFO messages and MWI_FAIL messages. These API messages are converted to SIP messages such as for example, MESSAGE type messages. Examples of API messages converted from the SIP NOTIFY messages sent by the VMS include MWI_ACT (message waiting indicator activation) or MWI_DEACT (message waiting indicator deactivation).

When communication signals are provided from the 5ESS switch 302 to the VMS 406, the voice portion 410 of the communication signal is converted to SIP and RTP packets via media gateways 404 and is provided to the TCP/IP network 306.

The data portion 408 of the communication signals is provided from the 5ESS switch 302 to the ports 202 of the interface 200. As shown, the translator 200 is connected to the switch 302 so as to provide two simultaneously active data links. The programming provided in the memory 210 of the interface 200 provides translation of the API signals from the switch 302 into SIP protocol. The ethernet port 206 of the interface 200 provides for connection of the interface 200 to the TCP/IP network 306. The SIP messages are provided from the TCP/IP network 306 to the VMS 406. The manner in which the messages are routed through the TCP/IP network 306 to the VMS 406 is well known.

When communication signals are provided from the VMS 406 to the 5ESS switch 302, SIP protocol messages are provided to the TCP/IP network 306. The voice portion 410 of the communication signals is provided from the TCP/IP network 306 through the media gateways 404 to the 5ESS switch 302. The data portion of the communication signals is provided from the TCP/IP network 306 in SIP protocol to the interface 200. The interface 200 then translates the SIP protocol messages to API protocol and then provides the API protocol messages to the switch 302.

The SIP messages from the VMS 406 provide an effective means to operate the message waiting indicator (MWI) of the telephone, for example. When the VMS 406 wants to activate or deactivate the MWI, the VM6 406 sends a SIP NOTIFY message to the interface 200 per RFC 3265. (A list of applicable RFCs is provided in Appendix B.) The interface 200 then converts the message into the format of the 5ESS switch to activate or deactivate the MWI (MWI_ACT and MWI_DEACT).

The communication signal between the switch 102 and the VMS 406 includes a data portion 412 and a voice portion 414. Because the VMS 406 uses SIP protocol, the data portion 412 of the communication signals between the SSP switch 102 and the VMS 406 must be translated from SMDI protocol to SIP protocol and vice versa. This translation is performed by the interface 200.

When communication signals are provided from the SSP switch 102 to the VMS 406, the voice portion 414 of the communication signal is converted to SIP and RTP packets via the media gateways 404 and is provided to the TCP/IP network 306. The data portion 412 of the communication signals is provided from the SSP switch 102 to a port 204 of the interface 200. Programming is provided in the memory 210 of the interface 200 which translates the SMDI signals form the switch 102 into SIP protocol. SMDI messages, for example, Call History messages, are converted to SIP MESSAGE Type messages and MWI Invalid and Blocked messages are converted to SIP 404 NOT FOUND and SIP 480 TEMPORARILY NOT AVAILABLE messages respectively. The ethernet port 206 of the interface 200 provides for connection of the interface 200 to the TCP/IP network 306. The SIP messages from interface 200 are provided to the TCP/IP network 306. The TCP/IP network 306 then forwards the messages to the VMS 406. The manner in which the messages are routed through the TCP/IP network 306 to the VMS 406 is well known.

When communication signals are provided from the VMS 406 to the SSP switch 102, SIP protocol messages are provided to the TCP/IP network 306. The voice portion 414 of the communication signals is provided from the TCP/IP network 306 through the media gateways 404 to the SSP switch 102. The data portion 412 of the communication signals is provided from the TCP/IP network 306 in SIP protocol to the interface 200 through the ethernet port 206. The interface 200 then translates the SIP protocol messages to SMDI protocol and then forwards the SMDI protocol messages to the SSP switch 102. The translated SIP message provides signaling for the MWI.

Another function provided by the interface 200 associated with the switch 102 is the ability to examine messages received from the SSP switch 102 in SMDI protocol for syntax and completeness. Although the SIP protocol provides techniques for examining messages for accuracy and completeness, such capabilities is not provided by the SMDI protocol. The interface 200, however, provides such functionality to the SMDI messages. The interface 200 associated with the switch 102 includes programming designed to handle incomplete or erroneous messages, i.e. "bad" messages. If an incomplete or erroneous message is received the interface 200 can be programmed to either throw the "bad" message away; pass the "bad" messages to the IP network 306, but log error; or when portions of the data are missing, if possible, repair the message prior to sending the message to the IP network 306. These techniques for handling the "bad" SMDI protocol messages are well known and can be incorporated into the programming of the interface 200.

The interface 200 can also be utilized to provide a "handshake" required by SIP protocol. The SIP protocol, utilized by the VMS 406 in the system 400, requires acknowledgment from the message's destination that the messages has been received by that destination. Such acknowledgment is commonly referred to as a "handshake". The SIP command which typically provides such acknowledgment is "200OK". If, for example, an SIP data message is passed directly from the VMS 406 to a switch which utilizes SIP protocol, upon receipt of the message by the switch, the switch will send a "200 OK" message to the VMS 406 to provide an indication that the switch has received the data message. If no such handshake or acknowledgment is received from the switch, the VMS 406 will "timeout" and attempt to send the message to the switch again. In the system 400, messages are provided to and from the SSP switch 102 in SMDI protocol. Unlike SIP protocol, SMDI protocol does not provided for such acknowledgment. Therefore, if no consideration is made for the failure to provide such acknowledgment, each time a message is passed from the VMS 406 to the switch 102, the necessary acknowledgment would not be passed to the VMS 406 to indicate that the message had been received. As a result, the VMS 406 would continue to attempt to send the message to the switch 102. To avoid this situation, when sending and receiving messages in SMDI protocol, the interface 200 provides the necessary acknowledgment or "handshake". An example of the process used to provide such acknowledgment is provided in Appendix C. Appendix C-1 relates to the message flows and interaction for 5ESS switches; Appendix C-2 relates to the message flows and interaction for switches other than the 5ESS type switch; and Appendix C-3 relates to message flows and interaction for an SS7 network.

The acknowledgment function described is an example of functionality that can be provided by the interface 200. Other functionality often not provided by switches includes confirmation of MWI activation or deactivation. Switches such as the 5ESS and the SSP, for example, typically provide only MWI failure indications. The interface 200 can, however, provide MWI activation or deactivation confirmation. When a MWI modification request is provided by the VMS via SIP NOTIFY message type, the interface 200 converts the MWI modification request to the protocol of the switch (e.g. API or SMDI) and places the information about this event, including a time indication of the message transmittal, in a transaction table in the memory of the interface 200. Because the switch will provide a MWI failure indication, the interface 200 will continue to process messages in both directions and will examine the transaction table periodically for a MWI failure indication. After a pre-determined amount of time, if no MWI failure indication is provided by the switch 102, 302, the translator 200 will assume the MWI modification request was successfully received by the switch 102, 302 and the message "200 OK" will be provided by the interface 200 to the VMS 406. If, on the other hand, the interface 200 receives a MWI failure message from the switch 102, 302, the cause of failure will be determined. If the message provided from the switch 102, 302 indicates that the MWI modification failed due to an invalid MWI request, which is typically due to a bad phone number, the interface 200 will provide a "404 NOT FOUND" SIP message. If the MWI modification failed because the request was blocked, which is typically due to resource restrictions on the switch 102, 302, the interface 200 will provide a "480 TEMPORARILY NOT AVAILABLE" SIP message. Examples of the process used to implement the message failure message is provided in Appendix D. Appendix D-1 relates to the message flows and interaction for 5ESS switches; Appendix D-2 relates to the message flows and interaction for switches other than the 5ESS type switch; and Appendix D-3 relates to message flows and interaction for an SS7 network.

As shown in FIG. 8, the interface 200 can also provide functionality in connection with an SS7 network. As is well known, the SS7 network includes a series of routing nodes or signal transfer points (STP) 402. The SS7 network is a signaling network which provides connection to a plurality of switches (not shown) which are connected to the STPs 402 via access links (A links). The SS7 network can, for example, route messages received by one switch to another switch. If the VMS 406 needs to control the MWI status in a switch, it can do so through the system 400 by sending an SIP message for the data portion of the communication signal to the TCP/IP network 306, the message is then received by the interface 200 which converts the SIP message to a TCAP message 416 and sends the message to the STP pair 402. The STP pair 402 in turn, will forward the TCAP message 416 to the appropriate switch which will toggle the MWI to the corresponding status. In addition to providing translation of a particular SIP messages to a specific TCAP message 416 that allows for MWI control, the interface 200 can perform a gateway function between the VMS 406 and the SS7 network. Thus, other messages including, for example, call control messages and SS7 maintenance messages can also be serviced.

The NOC 304 of the system 400 is identical to the NOC 304 of the system 300. As described above, the NOC 304 allows for monitoring and maintenance of the signaling between the VMS and the switch 102, 302.

Figure 5:
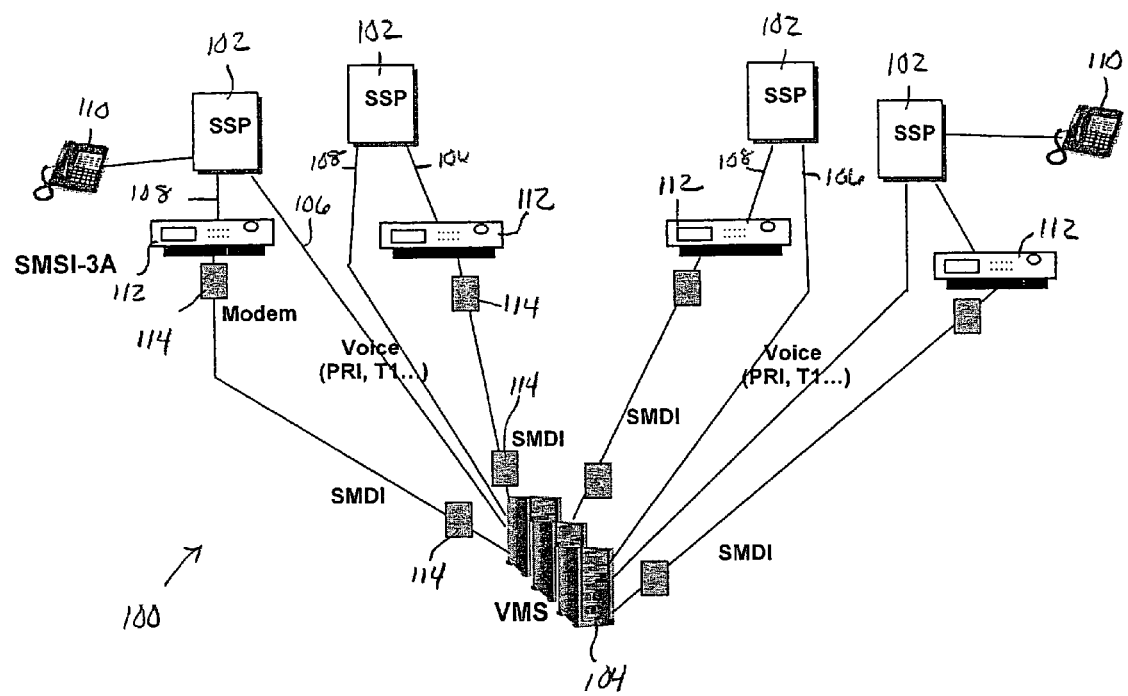
FIG. 5 is a diagram representing a prior art telephone system.

Unlike the systems 100, 300 shown in FIGS. 5 and 7 which utilize modems to transmit the data portions of the communication signals in a streaming format, the system 400 utilizes the TCP/IP network to span the distance between the switches 302, 102 and the VMS 406 and transmits the data messages in data packets. As shown and described, no modems are necessary to transmit the data portions of the messages. Thus, the point-to-point circuit of the system 100 has been replaced by the IP network 306. Unlike point-to-point circuits which provide a single transmission path for the data, the IP network 306 can provide numerous alternative paths for the transmission of data. In the event a particular transmission path is not available, alternate routes can be used to carry the data. Thus, the resiliency of the IP network is leveraged to provide a more reliable and efficient system. In addition, the dependency on a particular circuit and equipment, wherein failures are difficult to troubleshoot, is minimized.

Figure 9:
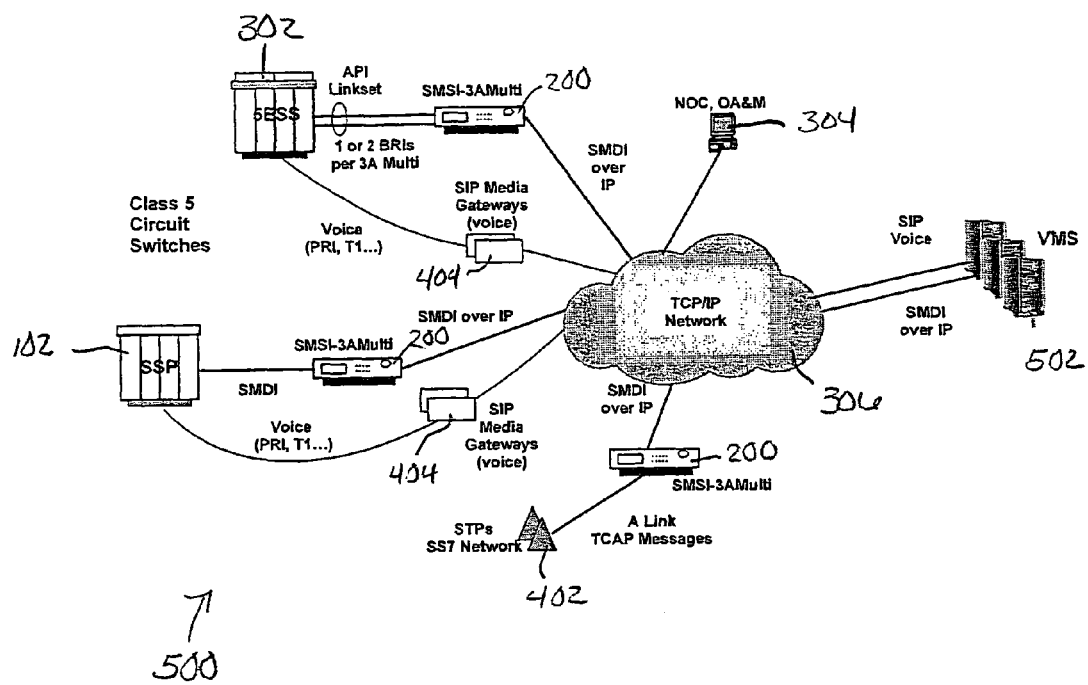
FIG. 9 is a diagram representing a telephone system incorporating the interface of the present invention in which the VMS utilizes SIP and SMDI protocols.

Another system 500 which utilizes the interface 200 is shown in FIG. 9. The system includes a 5ESS switch 302, a SSP switch 102, an STP pair 402, a VMS 502, a NOC 34, a TCP/IP network 306, and a plurality of interfaces 200. The system 500 is similar to the system 400 except the VMS 502 of the system 500 utilizes the SMDI protocol for the data portion of the communication signal and SIP for the voice portion of the communication signal. Thus, data messages sent to the VMS 502 and received from the VMS must be in SMDI protocol.

As described earlier, the communication signals from the 5ESS switch 302 include a data portion of the communication signal in API protocol. These API messages are provided to the interface 200 where they are converted to SMDI protocol before forwarding the messages to the TCP/IP network 306. The data messages are then provided by the TCP/IP network 306 to the VMS 502 in SMDI protocol. The voice portion of the communication signals from the 5ESS switch 302 is converted to SIP and RTP packets via media gateways 404 and is provided to the TCP/IP network in SIP protocol. The SIP protocol voice portions of the communication signals is then provided to the VMS 502.

The SSP switch 102 provides a communication signal having a data portion and a voice portion to be transmitted to the VMS 502. The data portion of the signal is provided in SMDI protocol. Because these data messages are provided in SMDI protocol no translation of the messages protocol is required. The SMDI messages are provided to the TCP/IP network 306 which then forwards the data portion of the messages to the VMS 502. Although the interface 200 does not provide translation of the data messages, use of the interface 200 eliminates the need for modems to carry messages between the switch 102 and the VMS 502.

In addition to elimination of the modems, use of the interface 200 provides additional functionality. The interface 200 is programmed to examine the data messages for syntax and completeness. As described above with respect to the system 400, if a "bad" messages is received by the translator 200, the translator 200 is programmed to either: throw the "bad" message away; pass the "bad" message to the VMS 502 over the IP network 306, but log an error; or in the event portions of the messages are missing, the message can be repaired prior to sending the message to the TCP/IP network 306. This same functionality is also provided by the interface 200 when the VMS 502 sends messages to the switch 102.

Further functionality is provided through the interface 200 when used in connection with a SS7 network. The interface 200 is connected to the SS7 network through a pair of STPs 402. As described above, the SS7 network provides connection to a plurality of switches. If the VMS 502 needs to control the MWI status in a switch, the data portion of the communication is provided to the interface 200 by way of the TCP/IP network 300 in SMDI protocol. The interface 200 receives the message from the network 306 and is programmed to convert the SMDI protocol message to a TCAP message. An A link of the SS7 network is then used to send the TCAP message to the STPs 402. The STPs 402 in turn will forward the TCAP message to the serving switch which will toggle the MWI to the corresponding status.

Unlike the system 400 shown in FIG. 8, the system 500 shown in FIG. 9 does not allow for call control, therefore only typical SS7 maintenance messages can be serviced by the interface 200 associated with the STPs 402.

As with the interface 200 associated with the switch 102, the interface 200 associated with the STPs 402 is designed to examine the data messages received from the VMS 502 for syntax and completeness. When a "bad" message is received from the VMS 502, the interface 200 is programmed to either: throw the "bad" message away; pass the "bad" message to the STPs 402 over the SS7 network, but log an error; or when portions of the data are missing, prior to sending the message to the STPs 402, the interface 200 can repair the "bad" message.

Figure 10:
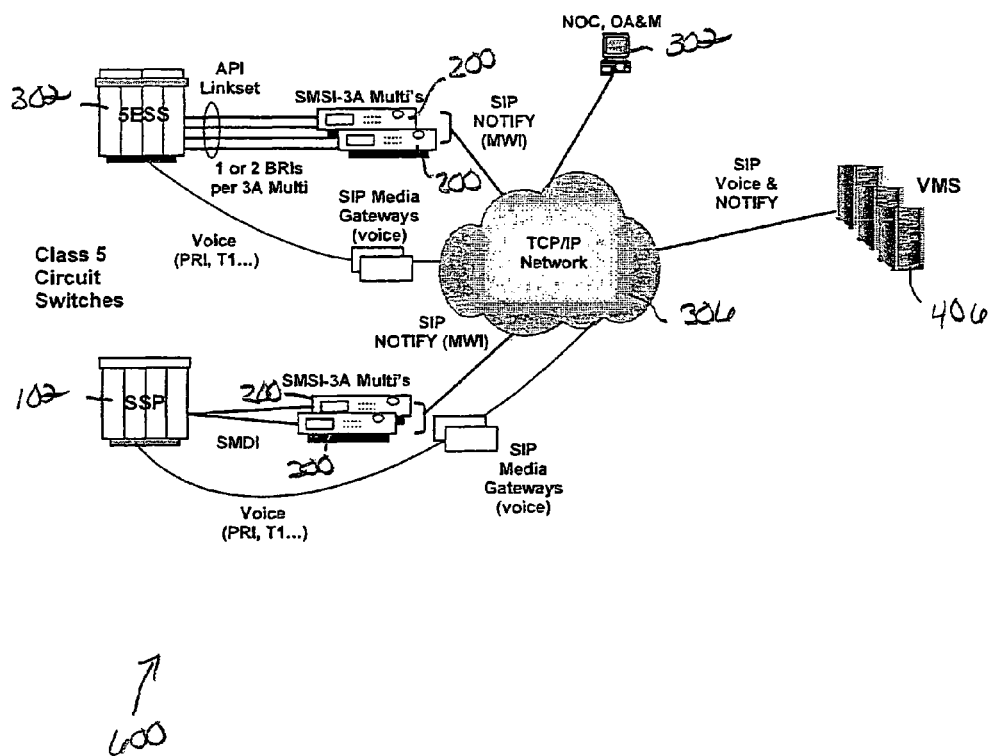
FIG. 10 is a diagram representing a telephone system incorporating the interface of the present invention in which two interfaces are associated with each switch.

The system 600 of FIG. 10 includes a 5ESS switch 302, an SSP switch 102, a VMS 502, a NOC 304, a TCP/IP network 306, and a plurality of interfaces 200. The system 600, of FIG. 10 is similar to the system 400 of FIG. 8, however, two interfaces 200a, 200b are associated with each switch 102, 302. Thus, as shown, the 5ESS switch 302 is connected to two interfaces 200a, 200b and the SSP switch 102 is associated with two interfaces 200a, 200b. Each pair of interfaces 200a, 200b is associated with a virtual IP address. The VMS 406 is also associated with the virtual IP address. Each interface 200a, 200b processes packets of data at a given time.

Each interface 200a, 200b has it own IP address and is also associated with the virtual IP address. One of the pair of interfaces 200a, 200b assumes the active/primary role and the other interface 200a, 200b assumes the back-up role. Which interface assumes the active/primary role is based upon which interface 200a, 200b comes online first. As the interfaces 200a, 200b are initialized, a small, random amount of delay is added to the initialization sequence so that the two systems initialize at slightly different rates. This, plus other typical differences insures that one of the two interfaces 200a, 200b will come online before the other and therefore will assume the primary/active role.

More specifically, the determination as to whether the interface 200a or the second interface 200b is the primary interface occurs in the following manner. Each interface 200a, 200b uses its own IP address and is constantly pinging the virtual IP address. If, for example, the interface 200b receives an answer, the interface 200b will not attempt to initialize the IP interface for the virtual IP address. In the case where the interfaces 200a, 200b are connected to an IP switch, the interface 200b will not receive any of the packets provided to the virtual IP address. In the case where the interfaces 200a, 200b are connected to a hub, the interface 200b will ignore the packets. On the other hand, if there is no response to the ping, the interface 200b assumes the primary role and it initializes the IP interface and receives the packets addressed to the virtual IP address. When the interface 200b assumes the primary/active role, the interface 200a will receive a response to the ping it sends to the virtual IP address, and therefore will not attempt to initialize the virtual IP address. Thus, the interfaces 200a, 200b are routinely pinging the virtual IP address and if at any time either interface 200a, 200b does not receive a response to its ping signal, that interface 200a, 200b will assume control and will initialize the virtual IP address. Although the transfer of control from one interface 200a, 200b to the other can cause some momentary lapse with respect to the transfer of communications, both the switch 102, 302 and the VMS 406 allow for re-synchronization of message communication thereby causing minimal impact to the communication.

Figure 11:
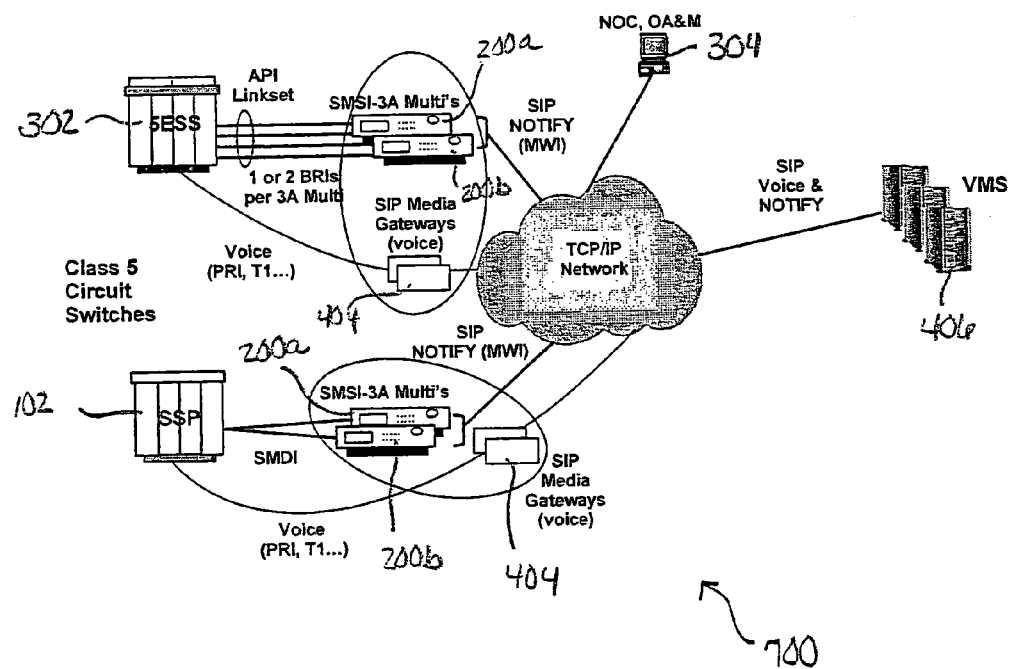
FIG. 11 is a diagram representing a telephone system incorporating the interface of the present invention in which the interface provides a proxy/redirect function for the voice portion of the communication signals.

The system 700 shown in FIG. 11 includes a 5ESS switch 302, an SSP switch 102, a NOC 304, a TCP/IP network 306, a VMS 406, a plurality of media gateways 404, and a plurality of interfaces 200. The system 700 is similar to the system 600 of FIG. 11, the interfaces 200 of the system 700, however, provide a SIP proxy/redirect server functionality. As previously described, the data portion of the communication signals is processed by the interfaces 200a, 200b as described above with respect to the system 600. The voice portion of the communication signals is processed by the media gateways 404. In the system 700, the interface 200a or 200b is configured to identify which media gateway 404 is available. The interface 200a or 200b stores the availability status of the media gateway 404 in its memory and continuously updates the availability status of the media gateways 404. The availability status of the media gateways can be determined using a variety of methods, including but not limited to: pinging the media gateways, performing SNMP commands such as GET on important MIB elements; using SIP messages or error responses; or requiring SIP registration by the media gateways 404 on a frequent basis. When the VMS needs to communicate with the 5ESS switch 302 for voice communication, the interface 200a or 200b receives an INVITE request from the VMS 406. The interface 200a or 200b then determines which media gateway 404 is available based on the present status in the memory of the interface 200a or 200b. Upon determination of the available media gateway 404, the interface redirects the voice signal to the available gateway using standard SIP communication. As shown, the interface 200a or 200b is programmed to support a virtual IP address as described above. Also, in this arrangement, the MWI control is performed via SIP NOTIFY messages. It is only necessary for the VMS to support SIP Notify interfacing. More specifically, there is no need to manage separate linkages for each switch 102, 302. Although not shown, it is possible to use the SIP proxy/redirect server functionality with the SMDI over IP architecture. In this case the Switch Provider can benefit because the Switch Provider can continue to offer the SMDI interface over IP or via RS232 while also enjoying the benefits of the SIP proxy/redirect server function from the same system.

While preferred embodiments of the present invention are shown and described, it is envisioned that those skilled in the art may devise various modifications of the present invention without departing from the spirit and scope of the appended claims.

The invention claimed is:

1. An interface for transmitting data messages between a telephone switching system and an adjunct processor comprising:
    a first connector for connecting the interface to the telephone switching system;
    a second connector for connecting the interface to the telephone switching system;
    wherein said first and second connectors provide two simultaneously active links for carrying the data messages between the interface and the telephone switching system;
    wherein the data messages are received by said simultaneously active links, translated between data message protocols by said interface, and transmitted to said adjunct processor; and
    wherein when a first or second link fails, any remaining of the data messages are carried on a remaining active one of said links.

2. The interface as defined in claim 1, wherein said interface is configured to alternate the transmission of the data messages amongst said links.

3. The interface as defined in claim 1, wherein the data messages are translated from API protocol to SMDIprotocol.

4. The interface as defined in claim 1, wherein said interface includes at least two device driver algorithms to filter erroneous frames from the data messages.

5. The interface as defined in claim 1, wherein said interface includes at least two protocol stack algorithms to validate the data messages.

6. The interface as defined in claim 5, wherein said interface includes a splitting task which receives messages from said at least two protocol stack algorithms.

7. The interface as defined in claim 1, wherein said interface includes a splitting task algorithm to split the data messages into subsets.

8. The interface as defined in claim 1, wherein said interface includes a combining task algorithm to combine the data messages into sets.

9. The interface as defined in claim 1, wherein said interface includes a combining task algorithm which alternates transmission of the data messages on at least two links.

10. The interface as defined in claim 1, wherein the data messages are received by said interface, translated between said data message protocols by said interface and transmitted to said adjunct processor.

11. An interfacing method for processing data messages between a telephone switching system and an adjunct processor and for translating data messages between data message protocols comprising the steps of:
    providing an interface including first and second connectors for connecting the interface to the telephone switching system;
    connecting the telephone switching system to said interface utilizing said first and second connectors to provide two simultaneously active transmission links between said telephone switching system and said interface;

transmitting the data messages between the telephone switching system and the adjunct processor utilizing said simultaneously active transmission links; and wherein when one of said active transmission links fails, any remaining of the data messages are transmitted on a remaining one of said active transmission links.

12. The method as defined in claim 11, wherein the step of transmitting the data messages is carried out by alternating the transmission of the data messages amongst said transmission links.

13. The method as defined in claim 11, further comprising the step of filtering erroneous frames from the data messages.

14. The method as defined in claim 11, further comprising the step of validating the data messages.

15. The method as defined in claim 11, further comprising the step of splitting the data messages into subsets.

16. The method as defined in claim 11, further comprising the step of translating the data messages between API protocol and SMDI protocol.

17. The method as defined in claim 11, further comprising the step of combining the data messages into sets.

* * * * *